(12) United States Patent
Park et al.

(10) Patent No.: US 11,558,474 B2
(45) Date of Patent: Jan. 17, 2023

(54) BROKERING APPARATUS AND BROKERING METHOD FOR TRUSTED REALITY SERVICE

(71) Applicant: ELECTRONICS AND TELECOMMUNICATIONS RESEARCH INSTITUTE, Daejeon (KR)

(72) Inventors: Pyung-Koo Park, Daejeon (KR); Tae Yeon Kim, Daejeon (KR); Ho Sun Yoon, Daejeon (KR)

(73) Assignee: Electronics and Telecommunications Research Instiitute, Daejeon (KR)

( * ) Notice: Subject to any disclaimer, the term of this patent is extended or adjusted under 35 U.S.C. 154(b) by 35 days.

(21) Appl. No.: 17/314,907

(22) Filed: May 7, 2021

(65) Prior Publication Data

US 2022/0247826 A1    Aug. 4, 2022

(30) Foreign Application Priority Data

Feb. 1, 2021    (KR) .................. 10-2021-0013934

(51) Int. Cl.
*G06F 15/16* (2006.01)
*H04L 67/51* (2022.01)
*H04L 47/783* (2022.01)
*H04L 47/2441* (2022.01)

(52) U.S. Cl.
CPC .......... *H04L 67/51* (2022.05); *H04L 47/2441* (2013.01); *H04L 47/783* (2013.01)

(58) Field of Classification Search
CPC .... H04L 67/51; H04L 47/2441; H04L 47/783

USPC .......................................... 709/223
See application file for complete search history.

(56) References Cited

U.S. PATENT DOCUMENTS

| 8,370,370 B2 | 2/2013 | Huang et al. |
| 10,744,902 B2* | 8/2020 | Machida ................... B60L 3/04 |
| 2010/0192223 A1* | 7/2010 | Ismael ................ H04L 63/1441 726/22 |
| 2016/0050163 A1* | 2/2016 | Wu ......................... H04L 51/42 709/206 |
| 2017/0240065 A1* | 8/2017 | Machida ............. H01M 10/486 |
| 2017/0316324 A1* | 11/2017 | Barrett ................... G06N 20/20 |

(Continued)

FOREIGN PATENT DOCUMENTS

| KR | 102119456 B1 | 6/2020 |
| KR | 1020200111032 A | 9/2020 |

OTHER PUBLICATIONS

Tae Yeon Kim et al., Draft Recommendation ITU-T Y.SBN-TR framework : "Service Brokering Network framework for Trusted Reality", International Telecommunication Union Telecommunication Standardization Sector, Jul. 21-30, 2020, SG13-TD629WP1.

(Continued)

*Primary Examiner* — Moustafa M Meky
(74) *Attorney, Agent, or Firm* — Rabin & Berdo, P.C.

(57) ABSTRACT

A trust reality service brokering apparatus located on an edge cloud receives a context rule, analyzes event data of at least one physical entity connected to the edge cloud based on the context rule, and transmits an action command to a physical entity or virtual entity corresponding to the event when it is determined that an event has occurred according to an analysis result.

8 Claims, 9 Drawing Sheets

(56) References Cited

U.S. PATENT DOCUMENTS

2018/0285644 A1 10/2018 Lee
2018/0367631 A1 12/2018 Son et al.

OTHER PUBLICATIONS

Tae Yeon Kim et al., "Viewpoint Networking for Trusted Reality", Eleventh International Conference on Ubiquitous and Future Networks (ICUFN) IEEE (2019).

* cited by examiner

BROKERING APPARATUS AND BROKERING METHOD FOR TRUSTED REALITY SERVICE

CROSS-REFERENCE TO RELATED APPLICATION

This application claims priority to and the benefit of Korean Patent Application No. 10-2021-0013934 filed in the Korean Intellectual Property Office on Feb. 1, 2021, the entire contents of which are incorporated herein by reference.

BACKGROUND OF THE INVENTION

(a) Field of the Invention

The following description relates to a brokering apparatus and brokering method for trusted reality service, and more particularly, to a brokering apparatus and brokering method for trusted reality service capable of interworking physical entities and virtual entities corresponding to the physical entities.

(b) Description of the Related Art

Trusted Reality service means a customized/immersive application service that can recognize knowledge and information by automatically connecting physical entities such as CCTV (closed-circuit television), sensors, etc., and corresponding virtual entities and communicating safely and convenience in real time.

Service brokering network refers to a network function that recognizes and mediates application services in real time in order to provide trust reality services.

Recently, interest in edge-cloud technology is increasing. The edge cloud technology refers to a cloud infrastructure that minimizes the physical distance from a mobile node by placing cloud resources at the edge of the network, unlike existing cloud computing. It is a technology suitable for low latency service by minimizing the physical distance from the mobile node.

SUMMARY OF THE INVENTION

At least one embodiment has been made in an effort to provide a brokering apparatus and brokering method for trusted reality service for providing a trust reality service by dynamically connecting physical entities and virtual entities in an edge cloud environment.

In one aspect, a brokering method for a trust reality service to provide the trust reality service in a trust reality service brokering apparatus that is located on an edge cloud is provided. The brokering method for a trust reality service includes: receiving a context rule; analyzing event data of at least one physical entity connected to the edge cloud based on the context rule; and transmitting an action command to a physical entity or virtual entity corresponding to the event when it is determined that an event has occurred according to an analysis result.

The brokering method for a trust reality service may further include: receiving a traffic rule; classifying data received from the at least one physical entity based on the traffic rule; and transferring the classified data to the corresponding virtual entity or application.

The brokering method for a trust reality service may further include: receiving a service deployment rule; searching an optimal service corresponding to a service request input from the at least one physical entity based on the service deployment rule; and transferring the searched optimal service to a corresponding virtual entity or application.

The brokering method for a trust reality service may further include transmitting a result of a service request to the at least one physical entity through the corresponding virtual entity or application.

The searching may include, when a service is configured by connection of virtual programs, generating service flow for transferring input data to a next connected virtual program according to the service deployment rule.

In another aspect, a brokering apparatus for trusted reality service located on an edge cloud is provided. The brokering apparatus for trusted reality service includes: an edge manager that manages physical resources of physical entities connected to the edge cloud and virtual resources of virtual entities installed inside the edge cloud; and an edge broker that processes the data of the physical entity or a request of a user based on the brokering rule and transmits the processing result to the corresponding physical entity or virtual entity.

The edge broker may include a context broker that analyzes data events occurring in the physical entity or virtual entity based on a context rule, and when an event occurs, transmits an action command to a physical entity or virtual entity corresponding to the event.

The edge broker may include a data broker that classifies data received from the physical entity based on a traffic rule, and transfers the classified data to a corresponding virtual entity or application.

The edge broker may include a compute broker that searches for an optimal service corresponding to a service request input from the physical entity based on a service deployment rule, and transfers the optimal service to a corresponding virtual entity or application.

When a service is configured by connection of virtual programs, the compute broker may generate a service flow according to the service configuration rule, and transfer input data to a next virtual program according to the service flow.

DETAILED DESCRIPTION OF THE EMBODIMENTS

The following detailed description will be described in detail with reference to the attached drawings so that a person of ordinary skill in the art may easily implement the present invention. The present invention may be modified in various ways, and is not limited thereto. In the drawings, elements that are irrelevant to the description are omitted for clarity of explanation, and like reference numerals designate like elements throughout the specification.

Throughout the specification and claims, when a part is referred to "include" a certain element, it means that it may further include other elements rather than exclude other elements, unless specifically indicated otherwise.

Hereinafter, a brokering apparatus and brokering method for a trust reality service according to an embodiment will be described in detail with reference to the accompanying drawings.

Figure 1:
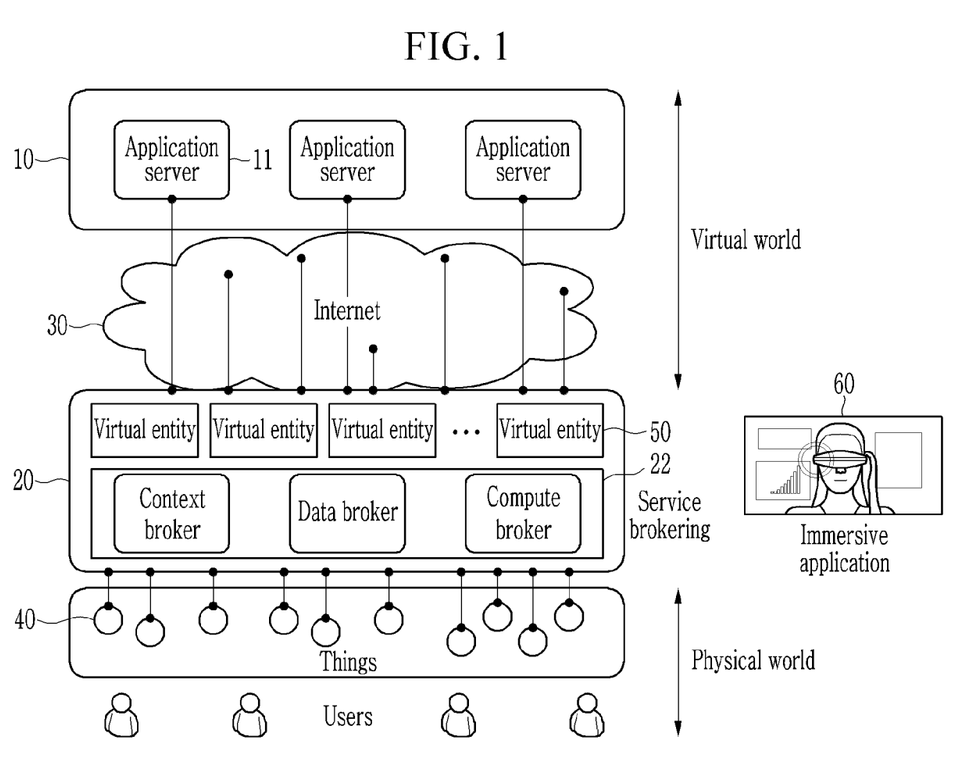
FIG. 1 is a diagram illustrating a network framework for trust reality service brokering according to an embodiment.

FIG. 1 is a diagram illustrating a network framework for trust reality service brokering according to an embodiment.

Referring to FIG. 1, a central cloud 10 and an edge cloud 20 are connected through a network 30 such as the Internet.

The central cloud 10 includes application servers 11 on which applications are executed.

Physical entities 40 such as Internet of Things (IoT) and CCTV are connected to the edge cloud 20. The physical entities 40 represent entities in the physical world.

The virtual entities 50 are installed in the edge cloud 20. The virtual entities 50 may include virtualization application programs that implement virtualization functions. The virtualization application programs may be application programs that control the physical entities 40 or provide a service using data.

In addition, the edge cloud 20 performs a service brokering function 22 for delivering data of the physical entities 40 to corresponding application programs.

The service brokering function 22 according to an embodiment means the function that recognizes and mediates application services in real time in order to provide an optimal customized/immersive application service 60, that is, a trust reality service, to a user by connecting the physical world and the virtual world.

The service brokering function 22 may include context brokering, data brokering, and compute brokering. The context brokering refers to providing customized services according to conditions and predefined rules based on the situation of each element such as objects, devices, and network elements. For this, it is necessary to provide a service according to the user's tendency or profile, and to provide an application service that uses IoT device information such as sensor data. The data brokering refers to providing necessary services by dynamically linking real data such as video streams from objects, devices, and network elements. It is relatively widely used in applications that handle large amounts of data streaming such as classification of data traffic, load balancing, forwarding, and chaining. The compute brokering is used for offload, device to device (D2D) collaboration, and collaboration between layers in the edge. This is for processing application services by efficiently utilizing intelligent collaboration based on AI (Artificial Intelligence) or computing resources of objects or devices and computing resources of the network layers.

Figure 2:
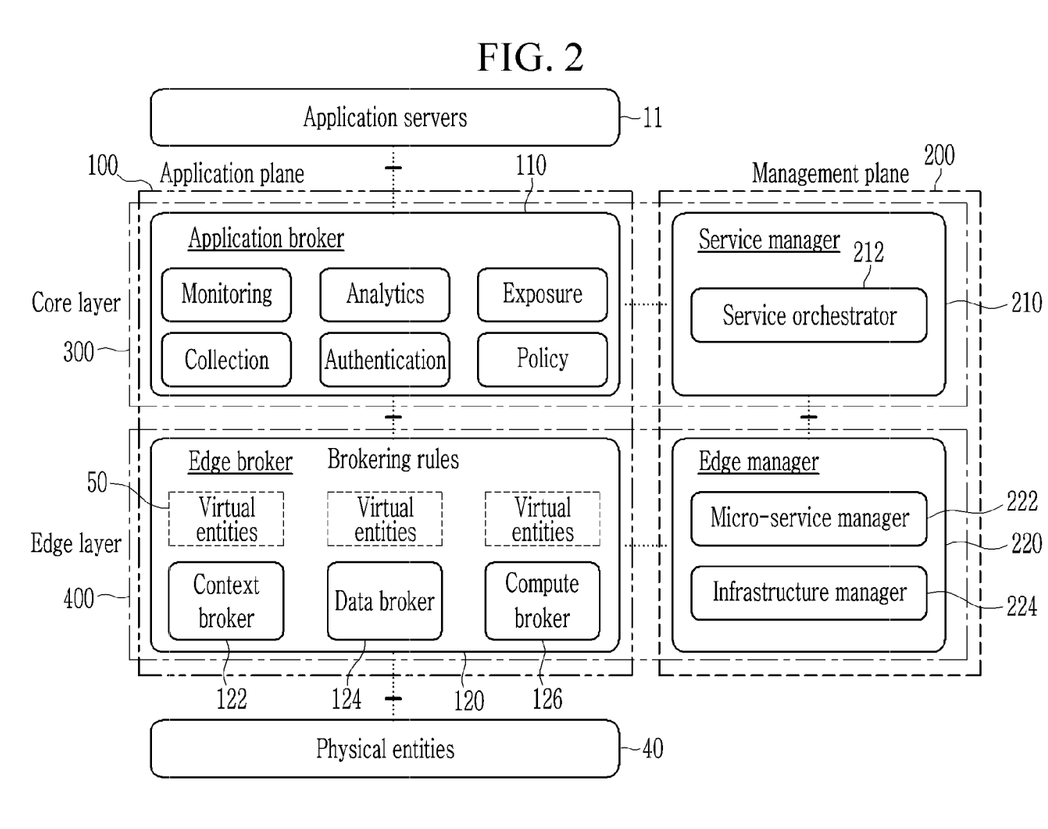
FIG. 2 is a diagram illustrating a trust reality service framework according to an embodiment.

FIG. 2 is a diagram illustrating a trust reality service framework according to an embodiment.

Referring to FIG. 2, the trust reality service framework is divided into an application plane 100 for controlling physical entities and a management plane 200 for controlling virtual entities according to a control target.

The application plane 100 controls interworking between the physical entities 40 and the virtual entities 50 according to the application service. The management plane 200 manages connection with the physical entities 40 and manages the life cycle of the virtual object 50.

In addition, the network framework for trust reality service brokering is divided into a core layer 300 and an edge layer 400 according to an installation location.

A brokering apparatus for a trust reality service according to an embodiment includes an application broker 110, an edge broker 120, a service manager 210, and an edge manager 220.

The application broker 110 is installed on the core layer 300 and operates on the application plane 100. The application broker 110 provides interworking between the external application server 11 and the external physical entities 40/virtual entities 50. The application broker 110 manages a virtual space and a physical space. The application broker 110 collects data of the external physical object 40 through the edge broker 120 and analyzes the collected data. In addition, if the program managing the physical entity 40 is in a virtual space, the application broker 110 sets a policy so that the data of the physical entity 40 can be transferred to the program in the virtual space. The application broker 110 performs a function of exposing the data to the outside when the server managing the data is physically far away. In addition, the application broker 110 performs user authentication through interworking with an authentication server.

The edge broker 120 is installed on the edge layer 400 and operates on the application plane 100. The edge broker 120 performs a service brokering function (22 of FIG. 1). That is, the edge broker 120 analyzes the data of the physical entities 40 based on a policy set by the application broker 110, that is, a brokering rule, and delivers the data to the physical entities 40 or the virtual entities 50. The edge broker 120 performs a function of transmitting commands for the control of the physical entities 40. The edge broker 120 may include a context broker 122, a data broker 124, and a compute broker 126.

The service manager 210 is installed on the core layer 300 and operates on the management plane 200. The service manager 210 includes a service orchestrator 212. The service orchestrator 212 manages virtual areas such as virtualization application programs and resource management.

The edge manager 220 is installed on the edge layer 400 and operates on the management plane 200. The edge manager 220 provides virtualization services. The edge manager 220 may include a micro-service manager 222 and an infrastructure manager 224. The micro-service manager 222 manages the lifecycle of micro-services, which are an independent minimum entity constituting a service, that is, from creation, change, scaling, and to destruction. The infrastructure manager 224 manages computing, networking, and storage resources for operating micro-services.

The edge layer 400 is a point of presence (PoP) of network services that can use proximity to provide services at a location close to a user.

The edge layer 400 is composed of distributed edge nodes, and the distributed edge nodes may provide services at a location close to a user using proximity. The distributed edge nodes may include an edge broker 120 and an edge manager 220. The edge layer 400 may be configured hierarchically, and each layer is optimized for a virtualization-based micro-service in consideration of characteristics of a service.

The core layer 300 is composed of core nodes, and the core nodes may include an application broker 110 and a service manager 210. The core nodes monitor distributed edge nodes and provide network services through the edge network. In addition, the core nodes integrate and manage network services by collecting data of each node related to the network service instance. The integrated data for network services includes operational and management data, and network services are operated and executed for users.

When describing a service scenario as an example, the application broker 110 sets a policy to deliver authentication data to an authentication server when authentication data are input from a user, and performs user authentication. After user authentication, when a user applies for a service to control CCTV, the application broker 110 requests the service manager 210 to install a virtual CCTV capable of controlling the CCTV. At this time, the application broker 110 sets a policy, that is, a brokering rule, to deliver physical CCTV data to the virtual CCTV to the edge broker 120. Then, when the edge broker 120 receives physical CCTV data, it transmits the physical CCTV data to the virtual CCTV according to the set brokering rule.

Figure 3:
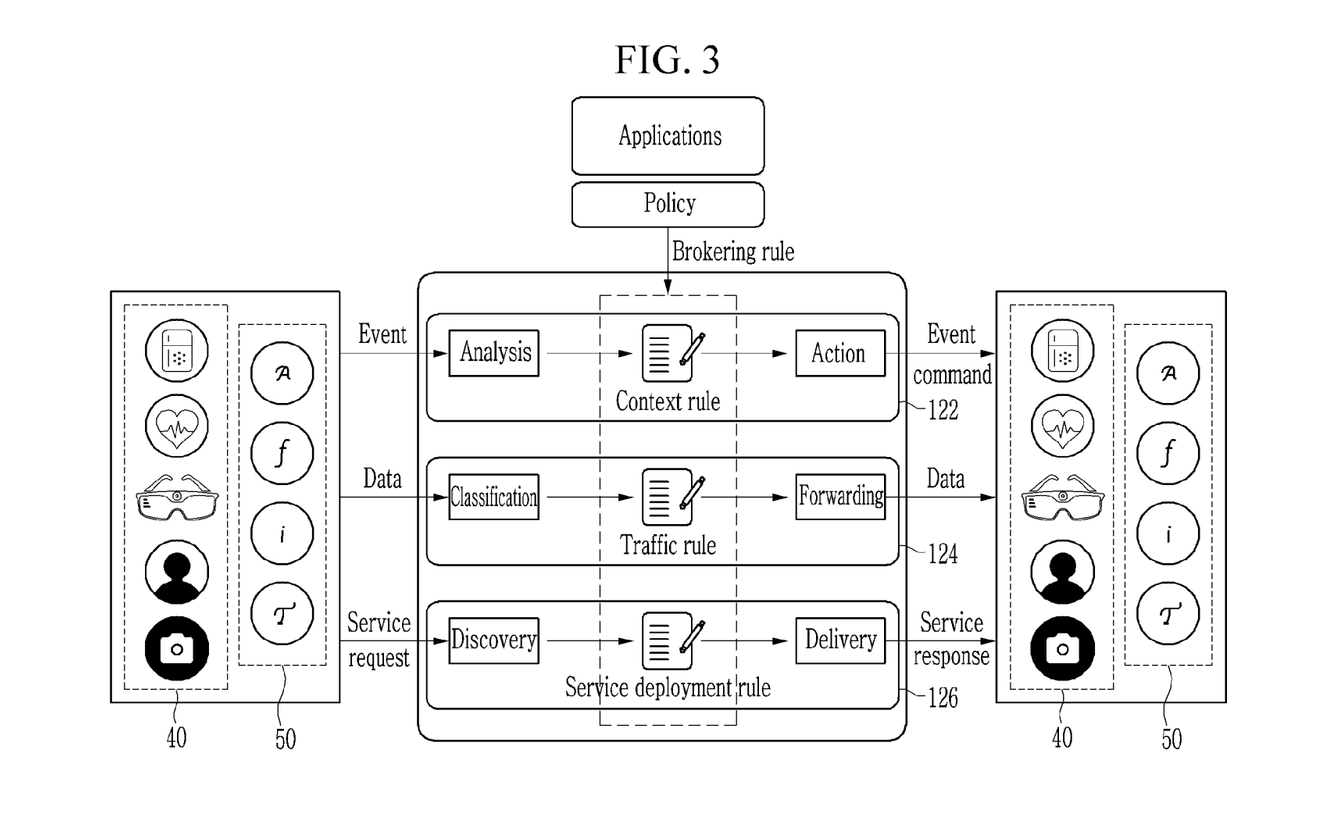
FIG. 3 is a diagram illustrating service brokering according to an embodiment.

FIG. 3 is a diagram illustrating service brokering according to an embodiment.

Referring to FIG. 3, service brokering is classified into context brokering, data brokering, and compute brokering according to a set brokering rule. The brokering rule may include a context rule, a traffic rule, and a service deployment rule.

The context broker 122 analyzes event data and performs actions on events occurring in the physical entities 40 or the virtual entities 50 based on a set context rule. The context broker 122 may deliver event commands for performing the actions.

The data broker 124 classifies data received from the physical entities 40 or the virtual entities 50, and forwards the data to an external service, according to a set traffic rule. The data broker 124 processes network traffic such as streaming data or packet data received from the physical entities 40.

The compute broker 126 discovers service requests input from the physical entities 40 or the virtual entities 50, and delivers optimal services as service responses, according to a set service configuration rule. The compute broker 126 does not process packets, but finds a server for a service request from a user at a higher layer (for example, L7), and delivers the service the server.

Figure 4:
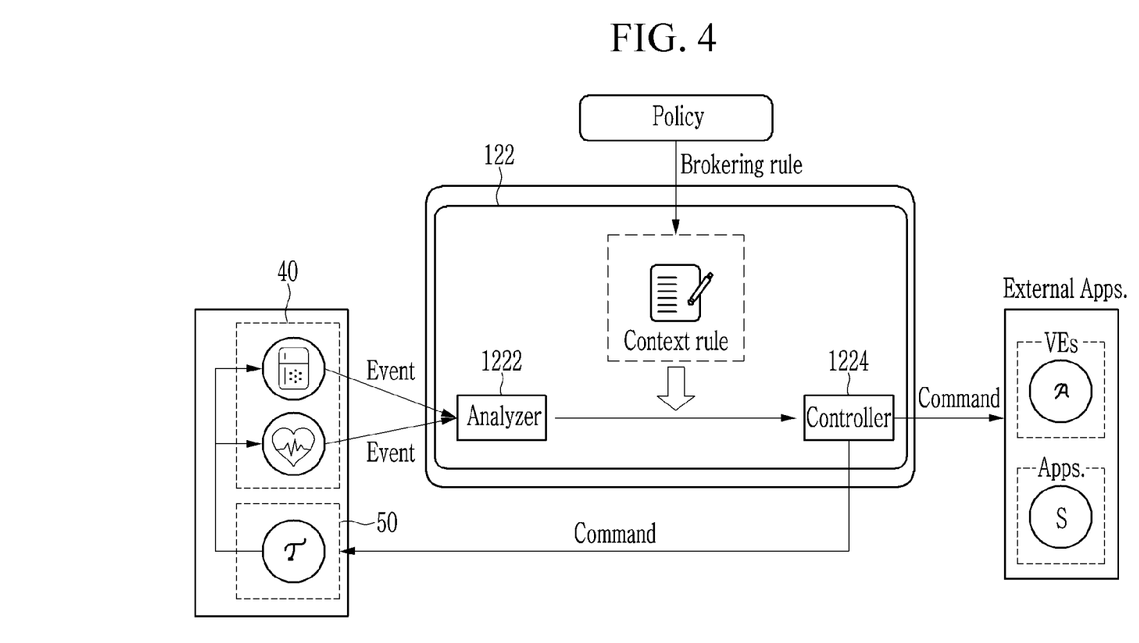
FIG. 4 is a diagram illustrating an example of a context broker according to an embodiment.

FIG. 4 is a diagram illustrating an example of a context broker according to an embodiment.

Referring to FIG. 4, the context broker 122 includes an analysis unit 1222 and a controller 1224.

The analyzer 1222 analyzes event data of at least one physical entity 40 and at least one virtual entity 50 based on a context rule, and transmits the analysis result to the controller 1224.

The controller 1224 determines that an event has occurred based on the analysis result, and takes an action. The controller 1224 may transmit command data for the action to a physical entity or a virtual entity corresponding to the event according to a context rule associated with the event.

For example, the analyzer 1222 of the context broker 122 analyzes content of temperature data received from the temperature sensor according to the context rule of "If the temperature of the temperature sensor is 80 degrees or higher, a cooling fan is operated", and check whether the temperature of the temperature sensor is 80 degrees. When the temperature of the temperature sensor reaches 80 degrees, the controller 1224 determines that an event has occurred, and transmits command data for operation to the cooling fan so that the cooling fan is operated.

Furthermore, when the analyzer 1222 of the context broker 122 receives the mail-related data, it analyzes the contents of the mail-related data, and if it is sent by an unknown person, it may treat the mail-related data as spam according to the context rule.

Figure 5:
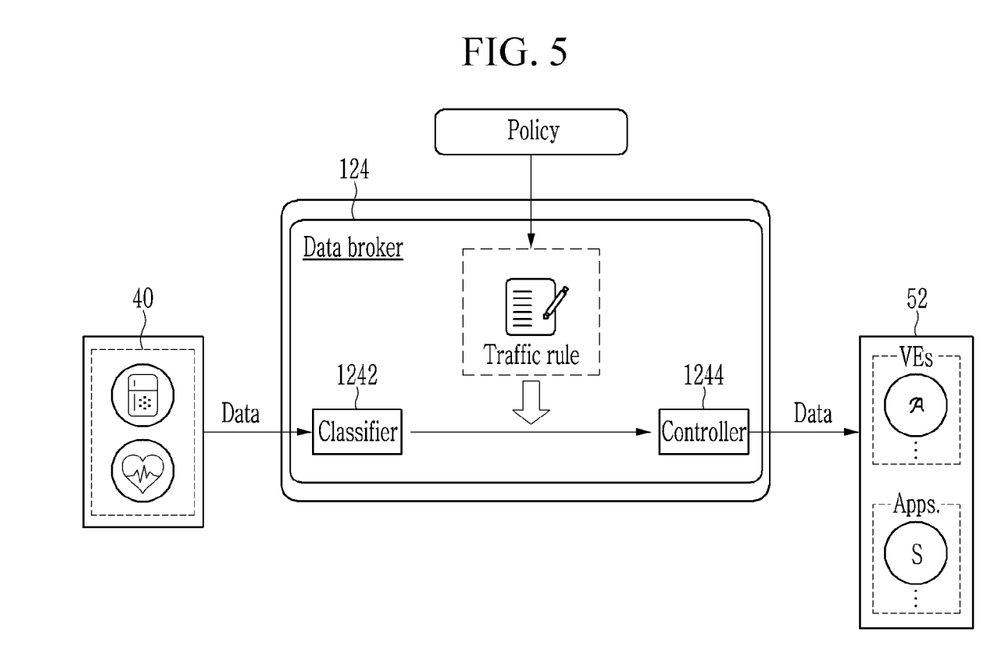
FIG. 5 is a diagram illustrating an example of a data broker according to an embodiment.

FIG. 5 is a diagram illustrating an example of a data broker according to an embodiment.

Referring to FIG. 5, the data broker 124 includes a classifier 1242 and a controller 1244.

The classifier 1242 classifies data received from at least one physical entity 40 according to a set traffic rule.

The control unit 1244 transfers the received data to the external application programs 52 based on the classification result.

Figure 6:
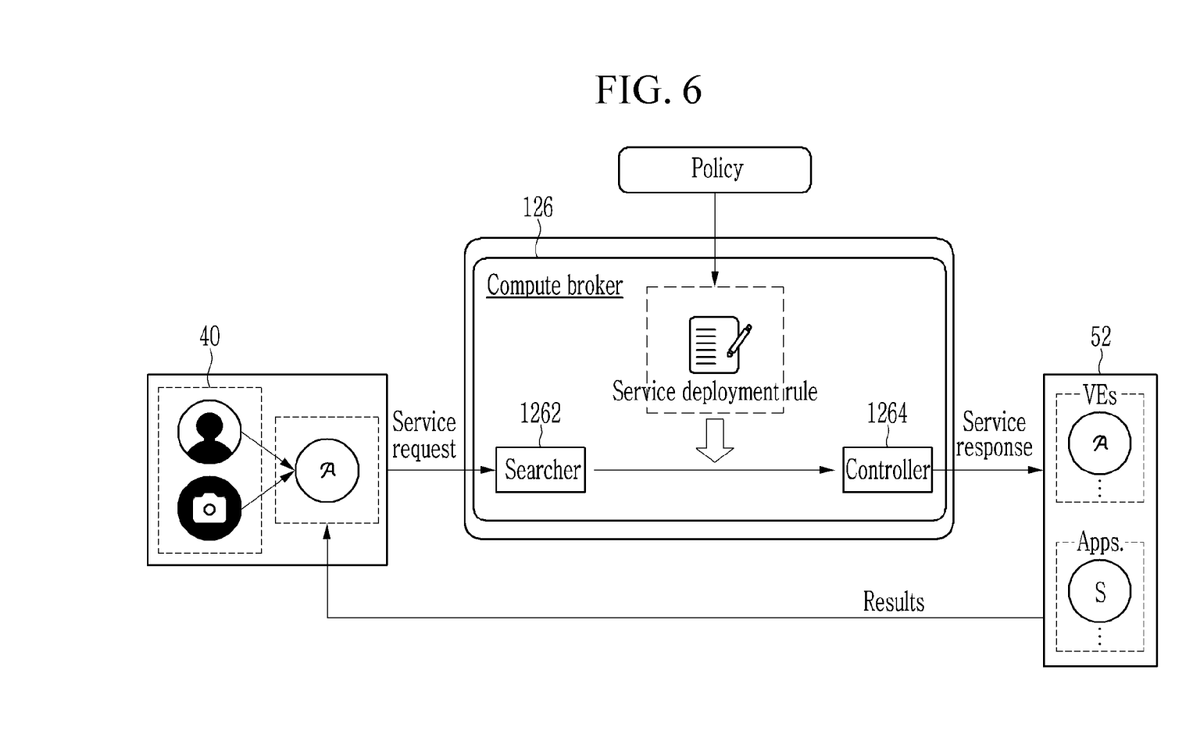
FIG. 6 is a diagram illustrating an example of a compute broker according to an embodiment.

FIG. 6 is a diagram illustrating an example of a compute broker according to an embodiment.

Referring to FIG. 6, the compute broker 126 includes a searcher 1262 and a controller 1264.

The searcher 1262 searches for an optimal processor capable of processing a service request input from at least one physical entity 40 according to a set service deployment rule. A virtual entity may be implemented in the physical entity 40. The service deployment rule indicates the location or address where the application service or application server is located.

The controller 1264 transfers the service request to the searched optimal processor. For example, the optimal processor may be the external application program 52, and the external application program 52 may transmit the processing result to the physical entity 40.

For example, when receiving mail-related data from the physical object 40, the search unit 1262 searches for a mail server capable of processing mail-related data according to the service configuration rule and returns the address of the corresponding mail server. The controller 1264 may transmit mail-related data from the physical entity 40 to the address of the corresponding mail server. Then, the mail server processes mail-related data and transmits the result to the physical entity 40.

In this way, the compute broker 126 does not determine the content or meaning of the input data, but finds an optimal processor capable of processing the data and delivers the input data.

Figure 7:
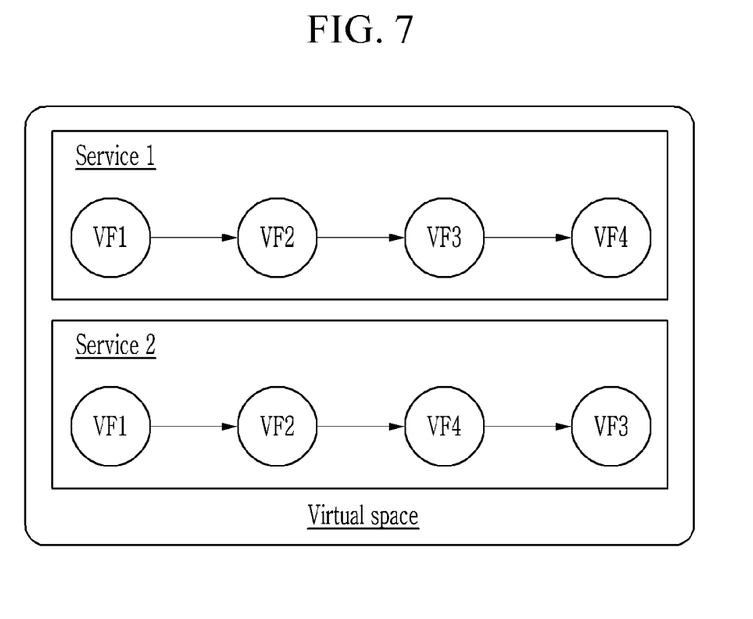
FIG. 7 is a diagram illustrating an example of a virtual service of a brokering apparatus for trust reality service according to an embodiment.

FIG. 7 is a diagram illustrating an example of a virtual service of a brokering apparatus for trust reality service according to an embodiment.

Referring to FIG. 7, service 1 and service 2 are configured by connection of virtual programs VF1, VF2, VF3, and VF4. The virtual program VF2 performs different operations in service 1 and service 2. That is, the virtual program VF2 delivers the result to the virtual program VF3 in service 1, and transfers the result to the virtual program VF4 in service 2.

In this way, in a virtual service, the control of the data flow according to the service definition is important.

Figure 8:
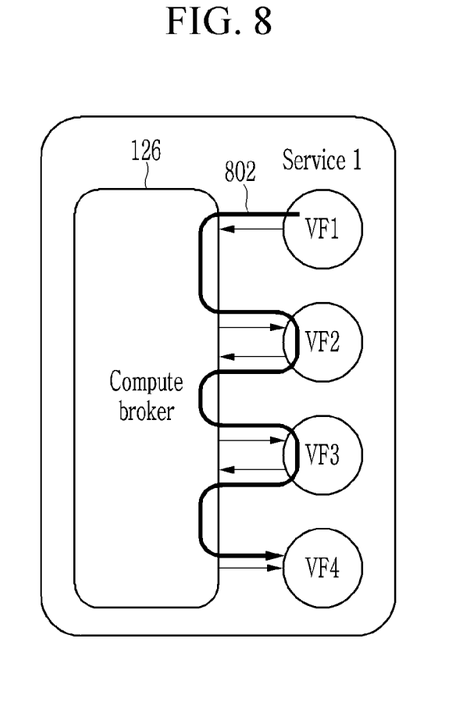
FIG. 8 is a diagram illustrating a flow of virtual service data in a brokering apparatus for trusted reality service according to an embodiment.

FIG. 8 is a diagram illustrating a flow of virtual service data in a brokering apparatus for trusted reality service according to an embodiment.

Referring to FIG. 8, when a service is deployed with virtualization programs, the compute broker 126 may search the next virtual program VF according to a service deployment rule and transmit input data to the next virtual program VF. That is, a forwarding graph 802 may be generated according to the service deployment rule. The compute broker 126 transfers data input according to the service flow to the next virtual program.

In addition, the context broker 122 may analyze input data according to the context rule, search the next virtual program VF, and deliver the corresponding input data.

Figure 9:
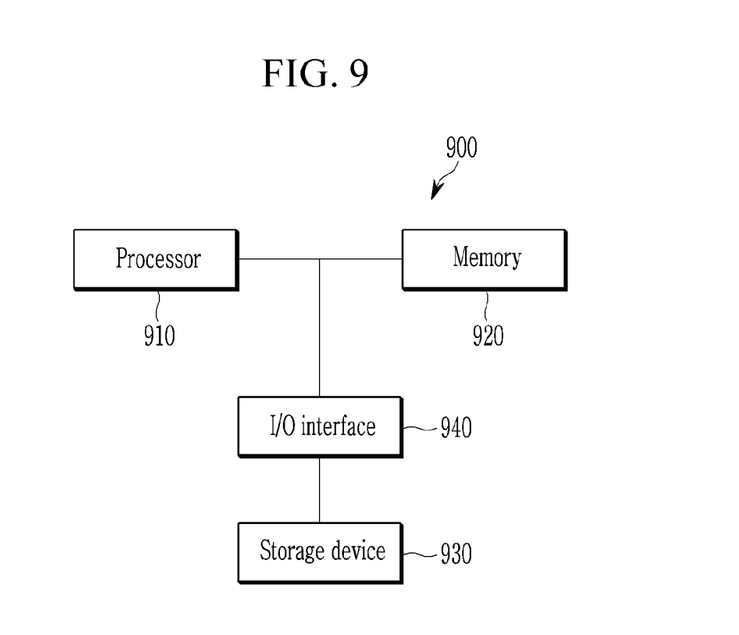
FIG. 9 is a diagram illustrating a brokering apparatus for a trust reality service according to another embodiment.

FIG. 9 is a diagram illustrating a brokering apparatus for a trust reality service according to another embodiment.

As shown in FIG. 9, the method of brokering a trust reality service may be implemented using the computing device 900.

The computing device 900 may include a processor 910, a memory 920, a storage device 930, and an input/output (I/O) interface 940. Each of the application broker 110, the edge broker 120, the service manager 210, and the edge manager 220 may be implemented by the computing device 900 shown in FIG. 9.

The processor 910 may be implemented as a central processing unit (CPU), another chipset, or a microprocessor.

The memory 920 may be implemented as a medium such as a random access memory (RAM), a dynamic random access memory (DRAM), a rambus DRAM (RDRAM), a synchronous DRAM (SDRAM), a static RAM (SRAM), etc.

The storage device 930 may be implemented as a hard disk, an optical disk such as a compact disk read only memory (CD-ROM), a CD rewritable (CD-RW), a digital video disk ROM (DVD-ROM), a DVD-RAM, a DVD-RW disk, Blu-ray disks, etc., a flash memory, or permanent or volatile storage devices such as various types of RAM.

The I/O interface 940 allows the processor 910 and/or the memory 920 to access the storage device 930.

The processor 910 may perform the service brokering function described with reference to FIGS. 1 to 8. The processor 910 may load program instructions for implementing a corresponding function among the application broker 110, the edge broker 120, the service manager 210, and the edge manager 220 into the memory 920, and may control to perform the operation described with reference to FIGS. 1 to 8. In addition, these program commands may be stored in the storage device 930, or may be stored in another system connected through a network. In particular, when the functions of the edge broker 120 are implemented by the computing device 900, the processor 910 loads program instructions for implementing at least some of the context broker 122, the data broker 124, and the compute broker 126 into the memory 920, and may control to perform the above-described operation. In this time, the context broker 122, the data broker 124, and the compute broker 126 may be implemented in different computing devices that are connected to each other.

According to at least one embodiment, it is possible to provide an optimal edge cloud service by interworking physical entities and virtual entities. The components described in the example embodiments may be implemented by hardware components including, for example, at least one digital signal processor (DSP), a processor, a controller, an application-specific integrated circuit (ASIC), a programmable logic element such as an FPGA, other electronic devices, or combinations thereof. At least some of the functions or the processes described in the example embodiments may be implemented by software, and the software may be recorded on a recording medium. The components, functions, and processes described in the example embodiments may be implemented by a combination of hardware and software. The method according to example embodiments may be embodied as a program that is executable by a computer, and may be implemented as various recording media such as a magnetic storage medium, an optical reading medium, and a digital storage medium. Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network. Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic or magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc., and magneto-optical media such as a floptical disk and a read only memory (ROM), a random access memory (RAM), a flash memory, an erasable programmable ROM (EPROM), and an electrically erasable programmable ROM (EEPROM), and any other known computer readable media. A processor and a memory may be supplemented by, or integrated into, a special purpose logic circuit. The processor may run an operating system (08) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media. The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination. Similarly, even though operations are described in a specific order in the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above-described example embodiments in all example embodiments, and it should be understood that the above-described program components and apparatuses may be incorporated into a single software product or may be packaged in multiple software products. It should be understood that the embodiments disclosed herein are merely illustrative and are not intended to limit the scope of the invention. It will be apparent to one of ordinary skill in the art that various modifications of the embodiments may be made without departing from the spirit and scope of the claims and their equivalents.

What is claimed is:

1. A brokering method for a trust reality service to provide the trust reality service in a trust reality service brokering apparatus located on an edge cloud, the method comprising:
   receiving a context rule;
   analyzing event data of an event of at least one physical entity connected to the edge cloud based on the context rule;
   transmitting an action command to a physical entity or virtual entity corresponding to the event when it is determined that the event has occurred according to an analysis result;
   receiving a traffic rule;
   classifying data received from the at least one physical entity based on the traffic rule; and
   transferring the classified data to the corresponding virtual entity or to a corresponding application.

2. A brokering method for a trust reality service to provide the trust reality service in a trust reality service brokering apparatus located on an edge cloud, the method comprising:
   receiving a context rule;
   analyzing event data of an event of at least one physical entity connected to the edge cloud based on the context rule;
   transmitting an action command to a physical entity or virtual entity corresponding to the event when it is determined that the event has occurred according to an analysis result;
   receiving a service deployment rule;
   searching an optimal service corresponding to a service request input from the at least one physical entity based on the service deployment rule; and
   transferring the searched optimal service to a corresponding virtual entity or application.

3. The method of claim 2, further comprising transmitting a result of a service request to the at least one physical entity through the corresponding virtual entity or application.

4. The method of claim 2, wherein
the searching includes, when a service is configured by connection of virtual programs, generating a service flow for transferring input data to a next connected virtual program according to the service deployment rule.

5. A brokering apparatus for trusted reality service located on an edge cloud, the apparatus comprising:
   an edge manager that manages physical resources of physical entities connected to the edge cloud and virtual resources of virtual entities installed inside the edge cloud; and
   an edge broker that processes data of a physical entity or a request of a user based on a brokering rule and transmits a processing result to a corresponding physical entity or virtual entity;
   wherein the edge broker includes a data broker that classifies data received from the physical entity based on a traffic rule, and transfers the classified data to a corresponding virtual entity or application.

6. The apparatus of claim 5, wherein
the edge broker includes a context broker that analyzes data events occurring in the physical entity or virtual entity based on a context rule, and when an event occurs, transmits an action command to a physical entity or virtual entity corresponding to the event.

7. The apparatus of claim 5, wherein
the edge broker includes a compute broker that searches for an optimal service corresponding to a service request input from the physical entity based on a service deployment rule, and transfers the optimal service to a corresponding virtual entity or application.

8. The apparatus of claim 7, wherein
when a service is configured by connection of virtual programs, the compute broker generates a service flow according to the service configuration rule, and transfers input data to a next virtual program according to the service flow.

* * * * *